(12) United States Patent
Fujimori et al.

(10) Patent No.: US 11,847,943 B2
(45) Date of Patent: Dec. 19, 2023

(54) SCREEN GENERATION METHOD, SCREEN GENERATION DEVICE, AND DISPLAY APPARATUS

(71) Applicant: SEIKO EPSON CORPORATION, Tokyo (JP)

(72) Inventors: Toshiki Fujimori, Chino (JP); Kazuki Nagai, Azumino (JP); Yuki Tamura, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/672,752

(22) Filed: Feb. 16, 2022

(65) Prior Publication Data

US 2022/0262286 A1 Aug. 18, 2022

(30) Foreign Application Priority Data

Feb. 16, 2021 (JP) ................. 2021-022331

(51) Int. Cl.
*G06F 3/14* (2006.01)
*G09G 3/00* (2006.01)
*H04N 9/31* (2006.01)

(52) U.S. Cl.
CPC ........... *G09G 3/001* (2013.01); *G06F 3/1438* (2013.01); *H04N 9/3147* (2013.01);
(Continued)

(58) Field of Classification Search
CPC ........ G06F 3/14; G06F 3/1415; G06F 3/1423; G06F 3/1446; G06F 3/1438; G06F 3/147;
(Continued)

(56) References Cited

U.S. PATENT DOCUMENTS

2015/0365727 A1 12/2015 Nagamine et al.
2017/0366782 A1* 12/2017 Morita .................... H04N 7/15

FOREIGN PATENT DOCUMENTS

JP 2016-005139 1/2016
JP 2016-046720 4/2016
JP 2017-092845 5/2017

OTHER PUBLICATIONS

Epson iProjection Operation Guide (Windows/Mac), 2016 Epson America, Inc.—122 pages.
(Continued)

*Primary Examiner* — Hau H Nguyen
(74) *Attorney, Agent, or Firm* — Dority & Manning, P.A.

(57) ABSTRACT

A screen generation method includes setting a first degree of priority for a first terminal, setting a second degree of priority for a second terminal, receiving first image data representing a first image from the first terminal via a first communication link, receiving second image data representing a second image from the second terminal via a second communication link, transmitting a degree-of-priority notification notifying the first degree of priority or the second degree of priority to at least one of the first terminal or the second terminal to control traffic of the first image data and the second image data so as to correlate with a relationship of the first degree of priority and the second degree of priority, generating a display screen including the first image and the second image, based on the first image data and the second image data, and when a disconnection of one of the first communication link or the second communication link occurs, changing the first degree of priority or the second degree of priority after a first time period from the occurrence of the disconnection.

7 Claims, 5 Drawing Sheets

(52) U.S. Cl.
CPC ..... *H04N 9/3179* (2013.01); *G09G 2370/025* (2013.01); *G09G 2370/045* (2013.01); *G09G 2370/08* (2013.01)

(58) Field of Classification Search
CPC ......... G09G 2370/20; G09G 2370/025; G09G 2370/04; G09G 2370/08; G09G 2370/22; H04N 9/3147
See application file for complete search history.

(56) References Cited

OTHER PUBLICATIONS

Infobit iShare Wireless Presentation User Guide, 2020 Version 1.0—12 pages.

* cited by examiner

SCREEN GENERATION METHOD, SCREEN GENERATION DEVICE, AND DISPLAY APPARATUS

The present application is based on, and claims priority from JP Application Serial Number 2021-022331, filed Feb. 16, 2021, the disclosure of which is hereby incorporated by reference herein in its entirety.

BACKGROUND

1. Technical Field

The present disclosure relates to a screen generation method, a screen generation device, and a display apparatus.

2. Related Art

JP-A-2017-92645 discloses a control system that decides the quality of content data according to the degree of priority of the content data and an available band in a communication network and that transmits the content data with the decided quality to a terminal.

However, in the technique disclosed in JP-A-2017-92845, a parameter that is already decided may be changed in a circumstance where the communication network is unstable.

SUMMARY

An aspect of the present disclosure is directed to a screen generation method including: setting a degree of priority for each of a plurality of terminals; receiving image data representing an image from each of the plurality of terminals via a communication link; transmitting a degree-of-priority notification notifying the degree of priority to at least one of the plurality of terminals according to the setting of the degree of priority and thus controlling traffic of the image data so as to correlate with the degree of priority; generating a display screen including a plurality of the images, based on a plurality of the image data; and when a disconnection of the communication link occurs, waiting for a change in the degree of priority during a predetermined time from the occurrence of the disconnection.

Another aspect of the present disclosure is directed to a screen generation device including: a communication interface receiving image data representing an image from each of a plurality of terminals via a communication link; a processing circuit setting a degree of priority for each of the plurality of terminals, transmitting a degree-of-priority notification notifying the degree of priority to at least one of the plurality of terminals according to the setting of the degree of priority, and thus controlling traffic of the image data so as to correlate with the degree of priority; and a screen generation circuit generating a display screen including a plurality of the images, based on a plurality of the image data. When a disconnection of the communication link occurs, the processing circuit waits for a change in the degree of priority during a predetermined time from the occurrence of the disconnection.

Still another aspect of the present disclosure is directed to a display apparatus including: a communication interface receiving image data representing an image from each of a plurality of terminals via a communication link; a processing circuit setting a degree of priority for each of the plurality of terminals, transmitting a degree-of-priority notification notifying the degree of priority to at least one of the plurality of terminals according to the setting of the degree of priority, and thus controlling traffic of the image data so as to correlate with the degree of priority; a screen generation circuit generating a display screen including a plurality of the images, based on a plurality of the image data; and a display device displaying the displays screen. When a disconnection of the communication link occurs, the processing circuit waits for a change in the degree of priority during a predetermined time from the occurrence of the disconnection.

DESCRIPTION OF EXEMPLARY EMBODIMENTS

Figure 1:
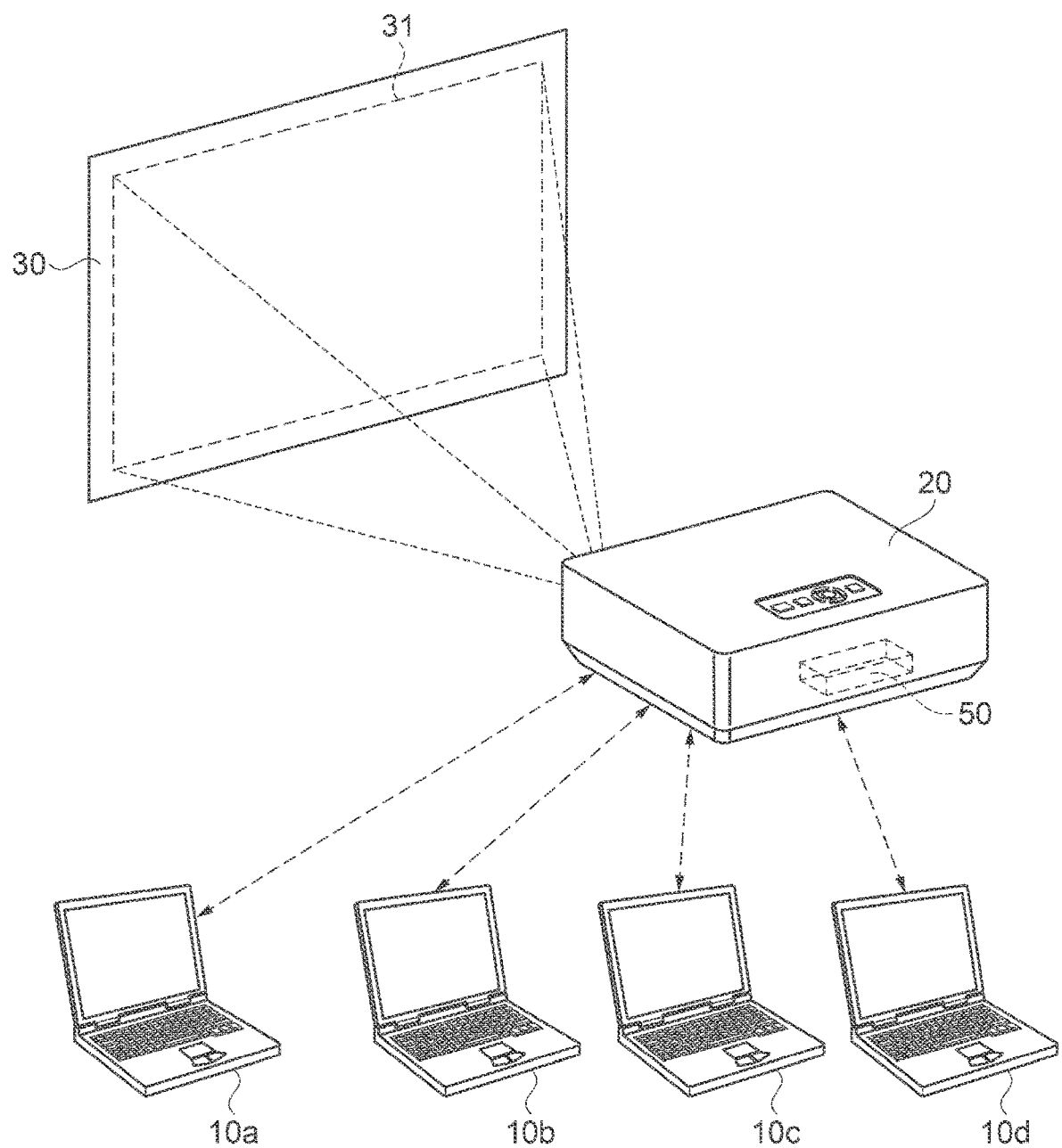
FIG. 1 is a schematic view explaining a display system according to an embodiment.

An embodiment of the present disclosure will now be described with reference to the drawings, In the drawings, identical or similar components are denoted by identical or similar reference signs and the description of such components may not be repeated. The embodiment described below is an example of a system for embodying the technical idea according to the present disclosure and a device and a method used for this system. The type and configuration of each device, the network topology, the series of processes or the like in the technical idea according to the present disclosure are not limited to those described below.

As shown in FIG. 1, a display system according to an embodiment has a plurality of terminals 10*a*, 10*b*, 10*c*, 10*d*, and a display apparatus 20. In this embodiment, the display apparatus 20 is a projector projecting light onto a screen 30 and thus displaying an image 31. The display apparatus 20 may be another display device such as a flat panel display device. As the flat panel display device, for example, a liquid crystal display device, a plasma display device, an organic electroluminescence display device or the like can be employed.

Each of the plurality of terminals 10*a*, 10*b*, 10*c*, 10*d* is a computer device having a function of supplying image data representing an image to the display apparatus 20. In the example shown in FIG. 1, the number of the terminals 10*a*, 10*b*, 10*c*, 10*d* is four. However, the number of terminals may be any number equal to or greater than 2. In the description below, when the terminals 10*a*, 10*b*, 10*c*, 10*d* are not particularly distinguished from each other, one of the terminals 10*a*, 10*b*, 10*c*, 10*d* is simply referred to as a "terminal 10". In this embodiment, each terminal 10 is a laptop computer. Each terminal 10 may be another computer device such as another type of personal computer (PC), a tablet terminal, a smartphone, or a microcontroller. That is, the terminal 10 may be a small device such as a to-called USB dongle that is coupled to another PC, for example, and thus transmits image data outputted from the PC, wirelessly to the display apparatus 20.

Figure 2:
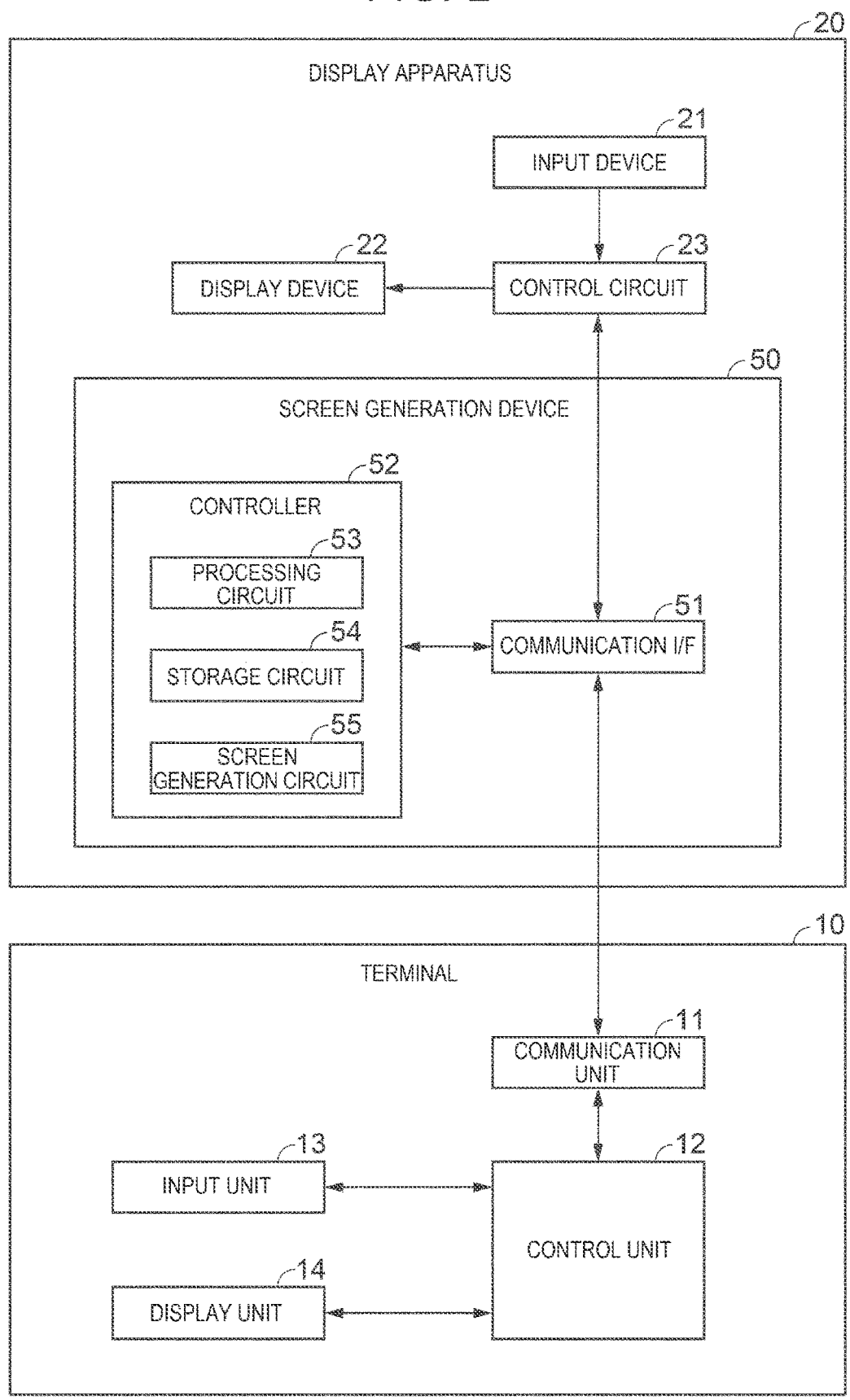
FIG. 2 is a block diagram explaining the display system according to the embodiment.

As shown in FIG. 2, the display apparatus 20 has an input device 21, a display device 22, a control circuit 23, and a screen generation device 50, for example. The input device 21 detects an operation by a user and outputs a signal corresponding to the operation by the user to the control circuit 23. As the input device 21, for example, various input devices such as a push-button, a touch sensor, a pointing device, and a microphone can be employed. The input device 21 may include a wireless or wired remote controller.

The display device 22 has a light source, a display element such as a liquid crystal panel having a plurality of pixels, and an optical system including a lens, a mirror or the like, for example. The control circuit 23 generates a drive signal driving the display element, based on image data outputted from the screen generation device 50. The display element modulates light emitted from the light source, according to the drive signal. The display device 22 under the control of the control circuit 23 projects the light passing through the display element onto the screen 30 by using the optical system, and thus displays the image 31 based on the image data. In this way, the display device 22 can display an image acquired from the terminal 10.

The control circuit 23 has a processing device performing arithmetic processing that is necessary for the operation of the display apparatus 20, and a storage device storing a program representing a series of processes and various data that are necessary for the operation of the display apparatus 20. As the processing device, for example, various logic operation circuits such as a central processing unit (CPU), a digital signal processor (DSP), a programmable logic device (PIM, and an application-specific integrated circuit (ASIC) can be employed. As the storage device, for example, a computer-readable storage medium such as a semiconductor memory can be employed. The storage device is not limited to a non-volatile auxiliary storage device and may include a volatile main storage device such as a register or a cache memory. Each of the processing device and the storage device may be formed of an integrated piece of hardware or a plurality of separate pieces of hardware.

The screen generation device 50 has a communication interface (I/F) 51 and a controller 52. The controller 52 has a processing circuit 53, a storage circuit 54, and a screen generation circuit 55. The screen generation device 50 generates a screen including a plurality of images acquired from the plurality of terminals 10a to 10d and thus causes the display device 22 to display the image 31. In this embodiment, the screen generation device 50 forms a part of the display apparatus 20. However, the screen generation device 50 may be, for example, a device attachable to and removable from the display apparatus 20, such as a wireless display adaptor.

The communication I/F 51 under the control of the processing circuit 53 establishes a communication link to each of the terminals 10a to 10d and thus is communicatively coupled to the terminal 10. The communication I/F 51 receives image data representing an image from each of the terminals 10a to 10d via the communication link. The communication link may be a wired or wireless communication link, or a wired-wireless combination. That the communication I/F 51 may be directly coupled to the terminal 10 or indirectly coupled to the terminal via another communication device. The communication I/F 51 may include, for example, an antenna transmitting and receiving a signal, a circuit processing a signal transmitted via the communication link, and a receptacle in which a plug of a communication cable is inserted.

The processing circuit 53 forms a processing device of a computer performing arithmetic processing that is necessary for the operation of the screen generation device 50. The processing circuit 53 executes, for example, a control program stored in the storage circuit 54 and thus implements various functions of the display apparatus 20 described in the embodiment. As the processing device forming at least a part of the processing circuit 53, for example, various logic operation circuits such as a CPU, a DSP, a PLD, and an ASIC can be employed. The processing circuit 53 may be formed of an integrated piece of hardware or a plurality of separate pieces of hardware.

The storage circuit 54 is a computer-readable storage medium storing a control program representing a series of processes and various data that are necessary for the operation of the screen generation device 50. As the storage circuit 54, for example, a semiconductor memory can be employed. The storage circuit 54 is not limited to a non-volatile auxiliary storage device and may include a volatile main storage device such as a register or a cache memory. At least a part of the storage circuit 54 may be formed by a part of the processing circuit 53. The storage circuit 54 may be formed of an integrated piece of hardware or a plurality of separate pieces of hardware.

The processing circuit 53 sets a degree of priority for each of the terminals 10a to 10d according to a predetermined condition. The processing circuit 53 sets a degree of priority for each of the terminals 10a to 10d, for example, according to the order in which the communication link is established. That is, the storage circuit 54 stores the degree of priority set by the processing circuit 53 and an identifier identifying the terminal 10 corresponding to the degree of priority, as degree-of-priority information example, when the communication link is established with the terminal 10a and the communication link is subsequently established with the terminal 10b, the processing circuit 53 sets a higher degree of priority for the terminal 10a than for the terminal 10b. However, the processing circuit 53 may set a higher degree of priority for the terminal 10 with which the communication link is established later. Alternatively, the processing circuit 53 may set a degree of priority according to the lapse of a predetermined time from the establishment of the communication link.

The processing circuit 53 may set a degree of priority for each of the terminals 10a to 10d in response to a request from the terminals 10a to 10d. For example, when receiving a request signal requesting a higher degree of priority from the terminal 10a, the processing circuit 53 sets a high degree of priority for the terminal 10a and a lower degree of priority for the terminals 10b to 10d than for the terminal 10a. In this case, an operation to the display apparatus 20 is not necessary and a degree of priority can be set by operating the terminals 10a to 10d. Meanwhile, when setting a degree of priority according to the order in which the communication link is established, a dedicated operation to the terminals 10a to 10d is not necessary.

The processing circuit 53 transmits a degree-of-priority notification, which is a signal for notifying the corresponding degree of priority according to the setting of the degree of priority to at least one of the terminals 10a to 10d via the communication I/F 51. Thus, the processing circuit 53 controls the terminals 10a to 10d in such a way that the amount of image data communicated, that is, the traffic of image data, correlates with the degree of priority. In other words, the processing circuit 53 controls the traffic of image data so as to correlate with the degree of priority. For example, the processing circuit 53 transmits the degree-ofpriority notification to each terminal 10 so that the traffic of image data from the terminal 10*a* having a higher degree of priority than the terminal 10*b* becomes greater than the traffic of image data from the terminal 10*b*.

The screen generation circuit 55 under the control of the processing circuit 53 generates screen data representing a screen to be displayed by the display device 22. The screen generation circuit 55 generates screen data based on a plurality of image data inputted from the terminals 10*a* to 10*d* via the communication I/F 51. The screen generation circuit 55 successively outputs the generated screen data to the display device 22 via the control circuit 23. The screen generation circuit 55 may include a rendering engine, a graphics memory, and the like. The screen generation circuit 55 may function as a circuit forming a part of the processing circuit 53.

Figure 3:
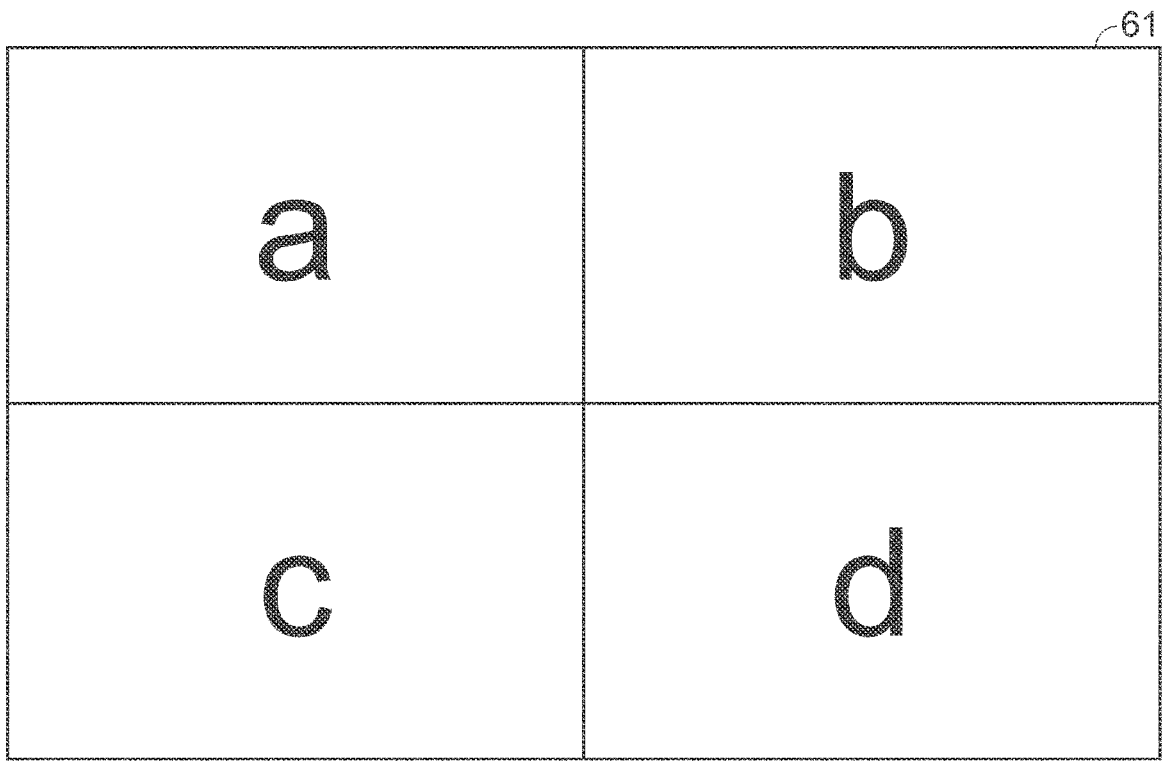
FIG. 3 explains an example of a display screen.

For example, as shown in FIG. 3, the screen generation circuit 55 generates a display screen 61 including a plurality of images, based on a plurality of image data received via the communication I/F 51. In the example shown in FIG. 3, four images represented by the image data from the terminals 10*a* to 10*d* are arranged in a 2×2 matrix in the display screen 61. The letters a to d express that the images are acquired from the terminals 10*a* to 10*d,* respectively. The image quality of each image data is equivalent to that of a split screen, for example. The screen generation circuit 55 outputs screen data representing the display screen 61 to the display device 22. Thus, the display device 22 displays the display screen 61.

As shown in FIG. 2, the terminal 10 has a communication unit 11, a control unit 12, an input unit 13, and a display unit 14, for example. The communication unit 11 under the control of the control unit 12 establishes a communication link to the display apparatus 20 and thus is communicatively coupled to the display apparatus 20. The communication unit 11 may include, for example, an antenna transmitting and receiving a wireless signal, a receptacle in which a plug of a communication cable is inserted, a circuit processing a signal transmitted via the communication link, or the like. The communication unit 11 under the control of the control unit 12 transmits image data representing an image to the display apparatus 20.

The control unit 12 has, for example, a processing device such as a CPU, and a storage device such as a semiconductor memory. The control unit 12 performs arithmetic processing that is necessary for the operation of the terminal 10. The control unit 12 executes, example, a program stored in the storage device and thus implements various functions of the terminal 10 described in the embodiment. The storage device of the control unit 12 stores, for example, a program representing a series of processes and various data that are necessary for the operation of the terminal 10. The control unit 12 may be formed of an integrated piece of hardware or a plurality of separate pieces of hardware.

The input unit 13 is an input device accepting an operation by a user and outputting a signal corresponding to the operation by the user, to the control unit 12. The input unit 13 may include, for example, a keyboard, various switches, a pointing device or the like. The display unit 14 is a flat panel display, for example. The input unit 13 and the display unit 14 may be integrated together into a touch panel display. For example, the transmission of image data is started in response to an operation by the user to the input unit 13 to the effect that a participation in the display screen 61 is requested.

The control unit 12 transmits image data to the display apparatus 20 via the communication unit 11. The control unit 12 decides a parameter of image data that defines the image quality of an image, according to the degree-of-priority notification transmitted from the display apparatus 20. The image quality and traffic of image data correlate with each other. For example, when the terminal 10*a* is notified of a high degree of priority, the parameter of image data is decided in such a way that the image of this image data has a higher image quality than the other images. For example, the image quality is divided into three stages, that is, high quality corresponding to a full screen, medium quality corresponding to a split screen, and low quality corresponding to a reduced screen. Thus, the traffic of image data from the terminal 10*a* is greater than the traffic of the other image data.

The control unit 12 decides at least one type of parameter from among three types of parameters, that is, the compression rate, the frame rate, and the resolution, as the parameter of image data. The control unit 12 generates image data having the decided parameter and transmits the image data to the display apparatus 20 via the communication unit 11. Alternatively, the control unit 12 may change the format of image data, for example, from a dynamic image format to a still image format, based on the degree-of-priority notification. In this way, the display apparatus 20 transmits the degree-of-priority notification and thus controls the image quality of the image data from the terminal 10 so as to correlate with the degree of priority and controls the traffic of image data.

For example, in a mode where a degree of priority is set for the terminals 10*a* to 10*d* in response to a request by the terminals 10*a* to 10*d,* when a request is not made by any terminal 10, the display apparatus 20 sets the same degree of priority for all the terminals 10*a* to 10*d.* Specifically, the processing circuit 53 sets a reference degree of priority in the storage circuit 54 in response to the establishment of the communication link to each of the terminals 10*a* to 10*d*. In this case, the terminals 10*a* to 10*d* generate image data having the same parameter as each other and transmit the image data to the display apparatus 20. Thus, the display apparatus 20 displays the display screen 61 including a plurality of images having the same image quality as each other, as shown in FIG. 3.

It is now assumed that the terminal 10*a* transmits a request signal to the display apparatus 20 in response to an operation by the user to the input unit 13 and thus requests a higher degree of priority. In response to the request by the terminal 10*a,* the processing circuit 53 changes the reference degree of priority for the terminal 10*a* to a higher degree of priority and thus sets a higher degree of priority for the terminal 10*a* than the degree of priority for the terminals 10*b* to 10*d.* The processing circuit 53 may have a function of destroying other request signals for a predetermined time from the time point when the request signal received, and thus preventing a conflict between a plurality of requests by the users of the terminals 10*a* to 10*d.* That is, the processing circuit 53 can ignore other requests for a predetermined time from a certain request. The processing circuit 53 may have a function of not destroying but storing other request signals, executing the stored request signals after the lapse of a predetermined time, and thus preventing a conflict between a plurality of requests by the users of the terminals 10*a* to 10*d.* That is, the processing circuit 53 can execute the next request after the lapse of a predetermined time from a certain request.

The processing circuit 53 transmits, to at least the terminal 10*a,* a degree-of-priority notification notifying that a high degree of priority is set for the terminal 10*a* according to the setting of the degree of priority for the terminal 10*a*. The control unit 12 of the terminal 10a decides a parameter of image data in such a way that the image quality of the image changes to be higher than the reference image quality, in response to the reception of the degree-of-priority notification. The control unit 12 transmits image data having the decided parameter to the display apparatus 20. Thus, the traffic of the image data from the terminal 10a increases in correlation with the high degree of priority.

Figure 4:
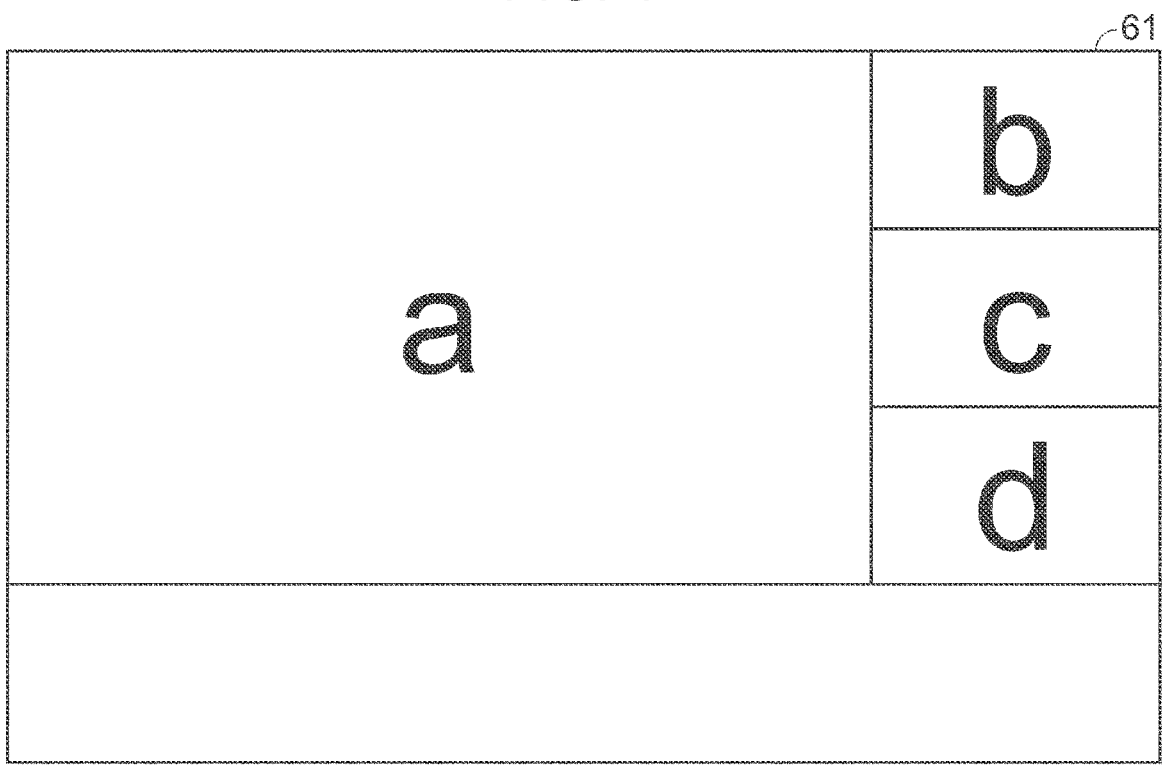
FIG. 4 explains another example of the display screen.

As shown in FIG. 4, the screen generation circuit 55 generates the display screen 61 in which the image from the terminal 10a is displayed in a larger size than the images from the other terminals 10b to 10d, based on the degree-of-priority information stored in the storage circuit 54 and the image data received by the communication I/F 51. That is, the degree of priority for the terminal 10 correlates with the size in the display screen 61. In this way, the screen generation circuit 55 decides a layout of a plurality of images in the display screen 61 according to the degrees of priority for the terminals 10a to 10d. Therefore, the display screen 61 having an image quality optimized according to the layout of images can be generated.

The processing circuit 53 may limit the number of terminals 10 for which the highest degree of priority is set, of the terminals 10a to 10d, to one. For example, when the number of terminals for which a high degree of priority is set is set to one and a high degree of priority is already set for the terminal 10a, the processing circuit 53 rejects a request by the terminal 10b for a higher degree of priority even when receiving such a request. In such a case, the processing circuit 53 may transmit, to the terminal 10b, a message showing the reason for rejecting the request, for example, that the number of terminals 10 for which a high degree of priority is set has already reached the upper limit, or the like.

The processing circuit 53 may also transmit a degree-of-priority notification notifying that a lower degree of priority than the reference is set, to the other terminals 10b to 10d. The control unit 12 of each of the terminals 10b to 10d decides a parameter of image data in such a way that the image quality of the image changes to be lower than the reference image quality, in response to the reception of the degree-of-priority notification. Each control unit 12 transmits image data having the decided parameter to the display apparatus 20. Therefore, the traffic of the image data from each of the terminals 10b to 10d decreases in correlation with the low degree of priority. Thus, the screen generation device 50 can prevent a network band from being strained due to the increased traffic and can improve the efficiency of use of a band. Also, making the processing by the screen generation circuit 55 or the like more efficient enables a reduction in the processing load on the display apparatus 20.

It is now assumed, for example, that a disconnection of the communication link occurs due to a network problem or the like in a circumstance where the communication state may become unstable, such as where the communication link between the terminals 10a to 10d and the display apparatus 20 includes a wireless link. In this case, reconnection processing automatically establishes the communication link again, thus enabling resumption of the transmission and reception of image data. However, if the degree-of-priority information changes every time a disconnection occurs, the layout and the image quality may be frequently changed, causing a disadvantage to the user.

To cope with this, when a disconnection of the communication link to the terminals 10a to 10d occurs, the processing circuit 53 waits for a change in the degree of priority during a predetermined time from the occurrence of the disconnection. Specifically, when the communication speed between the communication I/F 51 and the terminal 10 is lower than threshold, the processing circuit 53 determines that a disconnection of the communication link has occurred. The processing circuit 53 does not change the degree-of-priority information stored in the storage circuit 54 during a predetermined time from the time point when the disconnection of the communication link has occurred. The predetermined time can be decided arbitrarily from a range of several seconds to several minutes or the like, for example. Thus, the screen generation device 50 can prevent the already set degree of priority from being changed despite the user's intention.

The processing circuit 53 may set a degree of priority for each of the terminals 10a to 10d in response to an operation by the user to the input device 21. For example, the user carries out an operation to the input device 21 to the effect that the image from a particular terminal 10, of the images from the terminals 10a to 10d, is enlarged. Thus, the degree of priority for the terminal 10 is changed to a higher degree of priority, linked to the enlargement of the image from the terminal 10. Also, the setting of the degree of priority via the input device 21 may be prioritized over the requests by the terminals 10a to 10d.

Figure 5:
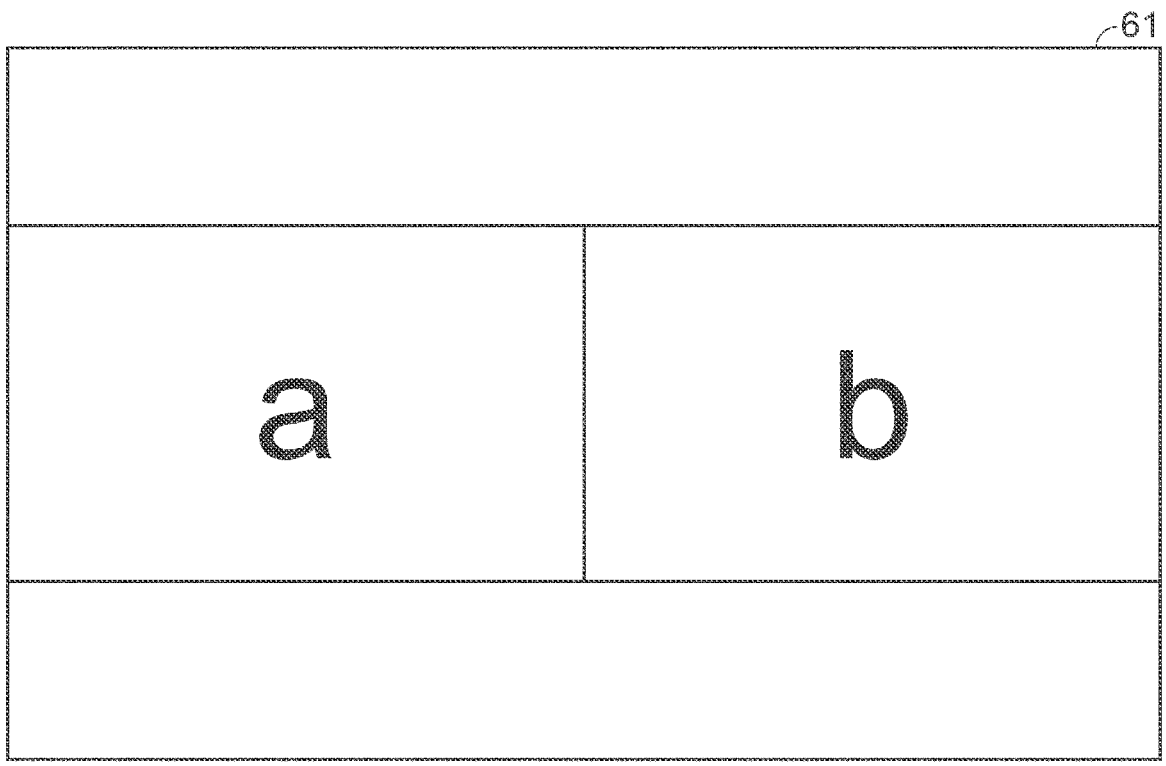
FIG. 5 explains still another example of the display screen.

For example, when the terminal 10a and the terminal 10b are coupled to the display apparatus 20, image data is transmitted from each of the terminal 10a and the terminal 10b and therefore the display screen 61 including two images of the same size is displayed, as shown in FIG. 5. The input device 21 detects an operation by the user to the effect that the size of the image from the terminal 10a is increased. The processing circuit 53 makes the degree of priority for the terminal 10a higher than the degree of priority for the terminal 10b and transmits a degree-of-priority notification to the terminal 10a.

Figure 6:
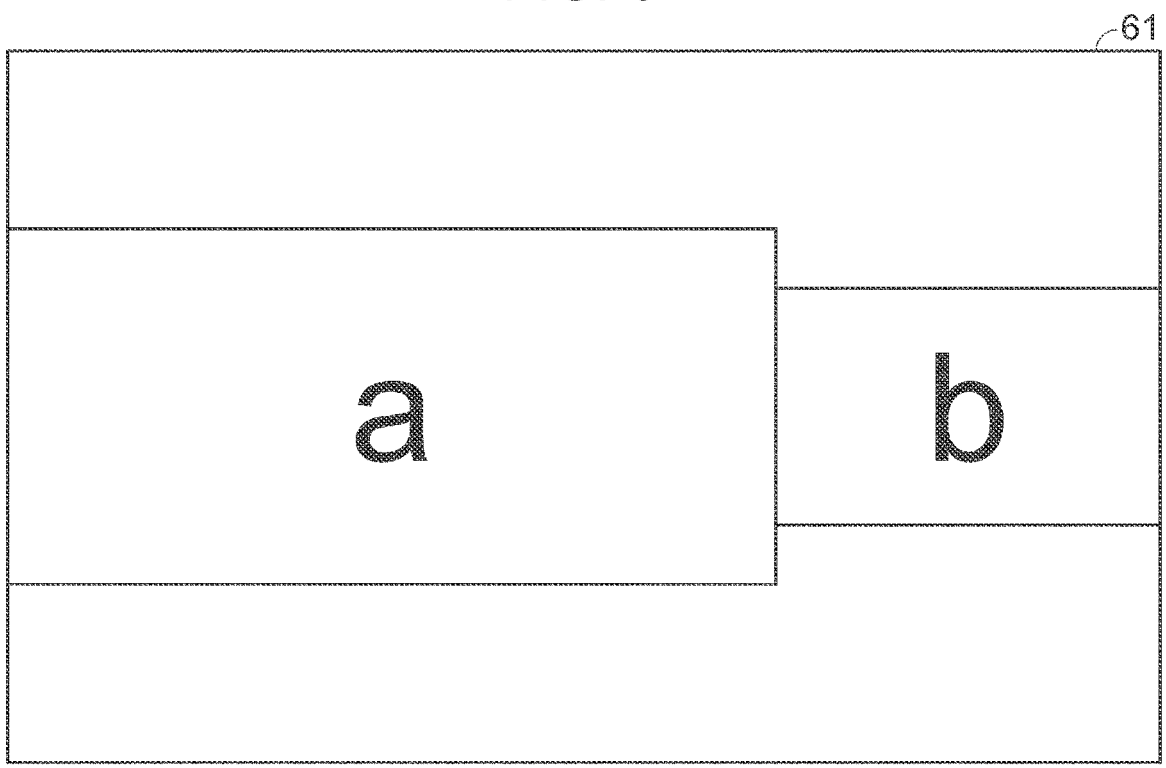
FIG. 6 explains still another example of the display screen.

As shown in FIG. 6, the screen generation device 50 generates the display screen 61 where the image from the terminal 10a is displayed in a larger size than the image from the terminal 10b, in response to the operation detected by the input device 21. In response to the degree-of-priority notification, the terminal 10a transmits image data having an improved image quality to the display apparatus 20. Therefore, a deterioration in the image quality of the image from the terminal 10a can be restrained in the display screen 61.

Also, the display apparatus 20 transmits a degree-of-priority notification notifying that the degree of priority is lowered, to the terminal 10b, and thus receives image data having a reduced image quality from the terminal 10b. That is, the traffic of the image data from the terminal 10b is smaller than the traffic of the image data from the terminal 10a. In this way, the display apparatus 20 can prevent a network band from being strained due to the increased traffic and can improve the efficiency of use of a band.

Alternatively, the processing circuit 53 may acquire, from the terminals 10a to 10d, a degree-of-priority class that is preset for the terminals 10a to 10d, and may set a degree of priority according to the acquired degree-of-priority class. For example, a degree-of-priority class "presenter" is preset for the terminal 10a and a degree-of-priority class "general" is preset for the terminal 10b. The processing circuit 53 acquires class information. representing the degree-of-priority class from each of the terminal 10a and the terminal 10b, for example, when establishing the communication link. Thus, the processing circuit 53 makes the degree of priority for the terminal 10a higher than the degree of priority for the terminal 10b and transmits a degree-of-priority notification to the terminal 10a and the terminal 10b. The processing circuit 53 may process a request by the terminal 10a for which the degree-of-priority class "presenter" is set, preferentially over the other.

Figure 7:
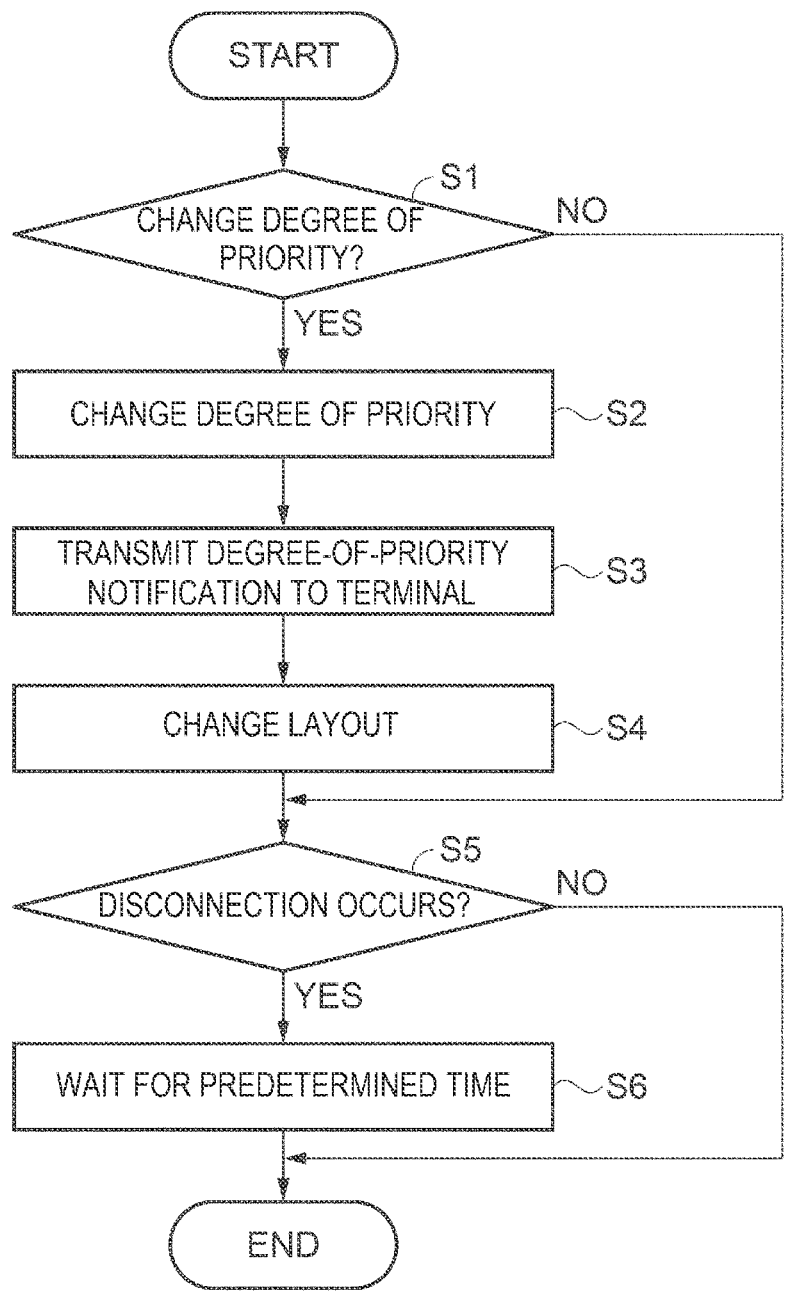
FIG. 7 is a flowchart explaining a screen generation method according to the embodiment.

An example of a screen generation method by the screen generation device 50 will now be described with reference to the flowchart of FIG. 7. A series of processes shown in FIG. 7 can be repeatedly executed on predetermined cycle.

First, in step S1, when a predetermined condition for setting a degree of priority for the terminals 10a to 10d is satisfied, the processing circuit 53 determines whether change the degree of priority set for the terminals 10a to 10d or not. As described above, for example, the reception of a request signal from the terminals 10a to 10d, the establishment of a communication link to the terminals 10a to 10d, or the like can be employed as the predetermined condition.

Specifically, the processing circuit 53 determines whether to change the degree of priority or not, based on the degree-of-priority information stored in the storage circuit 54. For example, when the number of terminals for which a high degree of priority is set is set to one and there is no terminal 10 yet for which a high degree of priority is set, the processing circuit 53 gives a permission in response to a request by the terminal 10 for a higher degree of priority and determines that the degree of priority for the terminal 10 is to be changed. Meanwhile, when the number of terminals for which a high degree of priority is set is set to one and a high degree of priority is already set for the terminal 10a, the processing circuit 53 ignores a request by the other terminals 10 for a higher degree of priority. In this way, when determining that the degree of priority is to be changed, the processing circuit 53 shifts the processing to step S2. When not determining that the degree of priority is to be changed, the processing circuit 53 shifts the processing to step S5.

In step S2, the processing circuit 53 updates the degree-of-priority information stored in the storage circuit 54 according to a predetermined condition and thus sets a degree of priority for each of the terminals 10a to 10d. In step S3, the processing circuit 53 transmits a degree-of-priority notification notifying the degree of priority to each of the terminals 10a to 10d. In step S4, the screen generation device 50 changes the layout of a plurality of images in the display screen 61, based on the degree-of-priority information.

In step S5, the processing circuit 53 determines whether a disconnection of the communication link to the terminals 10a to 10d occurs or not. When determining that a disconnection has occurred, the processing circuit 53 shifts the processing to step S6. When not determining that a disconnection has occurred, the processing circuit 53 ends the processing.

In step S6, the processing circuit 53 waits for a predetermined time from the occurrence of the disconnection. That is, the processing circuit 53 does not proceed to the next processing of S1. Therefore, even when communication link reconnection processing or the like is performed, the processing circuit 53 waits for a change in the degree of priority during a predetermined time from the time point when the disconnection of the communication link has occurred.

As described above, the screen generation device 50 waits for a change in the degree of priority during a predetermined time from a disconnection of the communication link. Therefore, the already set degree of priority can be prevented from being changed despite the user's intention. Also, in the screen generation device 50, the traffic of each image data decreases so as to correlate with a low degree of priority. Thus, the screen generation device 50 controls the traffic of image data so as to correlate with the degree of priority for the terminal 10. Therefore, a tightening of a network band due to the increased traffic can be prevented and the efficiency of use of a band can be improved.

While an embodiment has been described above, the present disclosure is not limited to the embodiment. The configuration of each part may replaced by any configuration having a similar function. Also, any configuration in each embodiment may be omitted or added within the technical scope of the present disclosure. Based on such omissions or additions, various alternative embodiments become obvious to a person skilled in the art.

For example, the predetermined condition for setting a degree of priority for the terminals 10a to 10d is not limited to the reception of a request signal or the establishment of a communication link. The processing circuit 53 may determine that the degree of priority is to be changed, for example, by detecting a change in an image due to a movement of a mouse cursor or the like, a change in sound, an operation to the input unit 13, or the like.

Also, the present disclosure includes various embodiments that are not described in this specification, such as a configuration where the foregoing components are applied to each other. The technical scope of the present disclosure is defined solely by the specifying matters according to the claims that are reasonable based on the foregoing description.

What is claimed is:

1. A screen generation method comprising:
    setting a first degree of priority for a first terminal;
    setting a second degree of priority for a second terminal;
    receiving first image data representing a first image from the first terminal via a first communication link;
    receiving second image data representing a second image from the second terminal via a second communication link;
    transmitting a degree-of-priority notification notifying the first degree of priority or the second degree of priority to at least one of the first terminal or the second terminal to control traffic of the first image data and the second image data so as to correlate with a relationship of the first degree of priority and the second degree of priority;
    determining a layout of the first image and the second image in a display screen according to the first degree of priority and the second degree of priority; and
    generating the display screen including the first image and the second image, based on the first image data and the second image data; and
    when a disconnection of one of the first communication link or the second communication link occurs, changing the first degree of priority or the second degree of priority after a first time period from the occurrence of the disconnection.

2. The screen generation method according to claim 1, wherein the first degree of priority and the second degree of priority are set according to an order in which the first communication link and the second communication link are established.

3. The screen generation method according to claim 1,
    wherein the first degree of priority is set in response to a first request by the first terminal, and
    the second degree of priority is set in response to a second request by the second terminal.

4. The screen generation method according to claim 3, wherein the second request is ignored during a second time period from the first request.

5. The screen generation method according to claim 1, further comprising;

Setting a third degree of priority for a third terminal, and

Setting the first degree of priority, the second degree of priority, and the third degree of priority in such a way that one of the first degree of priority, the second degree of priority, or the third degree of priority is prioritized while the other two are not prioritized.

6. A screen generation device comprising:

at least one communication interface receiving first image data representing a first image from a first terminal via a first communication link and second image data representing a second image from a second terminal via a second communication link;

at least one processing circuit programmed to execute setting a first degree of priority for the first terminal, setting a second degree of priority for the second terminal, transmitting a degree-of-priority notification notifying the first degree of priority or the second degree of priority to at least one of the first terminal or the second terminal to control traffic of the first image data and second image data so as to correlate with a relationship of the first degree of priority and the second degree of priority, determining a layout of the first image and the second image in a display screen according to the first degree of priority and the second degree of priority; and generating the display screen including the first image and the second image, and when a disconnection of the first communication link or the second communication link occurs, changing the first degree of priority or the second degree of priority after a first time period from the occurrence of the disconnection.

7. A display apparatus comprising:

at least one communication interface receiving first image data representing a first image from a first terminal via a first communication link and second image data representing a second image from a second terminal via a second communication link;

at least one processing circuit programmed to execute setting a first degree of priority for the first terminal, setting a second degree of priority for the second terminal, transmitting a degree-of-priority notification notifying the first degree of priority or the second degree of priority to at least one of the first terminal or the second terminal to control traffic of the first image data and second image data so as to correlate with a relationship of the first degree of priority and the second degree of priority, determining a layout of the first image and the second image in a display screen according to the first degree of priority and the second degree of priority; and generating the display screen including the first image and the second image, and when a disconnection of the first communication link or the second communication link occurs, changing the first degree of priority or the second degree of priority after a first time period from the occurrence of the disconnection; and a display device displaying the display screen.

* * * * *